United States Patent
Whittaker et al.

(10) Patent No.: US 7,171,358 B2
(45) Date of Patent: Jan. 30, 2007

(54) COMPRESSION OF LANGUAGE MODEL STRUCTURES AND WORD IDENTIFIERS FOR AUTOMATED SPEECH RECOGNITION SYSTEMS

(75) Inventors: Edward W. D. Whittaker, Tokyo (JP); Bhiksha Ramakrishnan, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 830 days.

(21) Appl. No.: 10/341,308

(22) Filed: Jan. 13, 2003

(65) Prior Publication Data

US 2004/0138884 A1 Jul. 15, 2004

(51) Int. Cl.
*G10L 15/06* (2006.01)
(52) U.S. Cl. .................. 704/243; 704/254; 704/240
(58) Field of Classification Search ............. 704/231, 704/254–257, 251, 240, 243
See application file for complete search history.

(56) References Cited

U.S. PATENT DOCUMENTS

| | | | | |
|---|---|---|---|---|
| 4,852,173 A | * | 7/1989 | Bahl et al. | 704/240 |
| 5,621,859 A | * | 4/1997 | Schwartz et al. | 704/256 |
| 5,634,086 A | * | 5/1997 | Rtischev et al. | 704/270 |
| 5,758,319 A | * | 5/1998 | Knittle | 704/251 |
| 5,765,133 A | * | 6/1998 | Antoniol et al. | 704/255 |
| 5,835,888 A | * | 11/1998 | Kanevsky et al. | 704/9 |
| 5,995,930 A | * | 11/1999 | Hab-Umbach et al. | 704/254 |
| 6,208,963 B1 | * | 3/2001 | Martinez et al. | 704/232 |
| 6,292,779 B1 | * | 9/2001 | Wilson et al. | 704/257 |
| 6,668,243 B1 | * | 12/2003 | Odell | 704/243 |
| 6,754,626 B2 | * | 6/2004 | Epstein | 704/235 |

OTHER PUBLICATIONS

Williams et al., "Compressing Integers for Fast File Access," *The Computer Journal*, vol. 42, No. 3, pp. 193-201, 1999.
Stolcke, "Entropy-based Pruning of Backoff Language Models," *Proceedings of 1998 DARPA Broadcast News Transcription and Understanding Workshop*, 1998.

* cited by examiner

*Primary Examiner*—Vijay B. Chawan
(74) *Attorney, Agent, or Firm*—Dirk Brinkman; Clifton D. Mueller; Gene V. Vinokur

(57) ABSTRACT

A method compresses one or more ordered arrays of integer values. The integer values can represent a vocabulary of a language mode, in the form of an N-gram, of an automated speech recognition system. For each ordered array to be compressed, and an inverse array I[.] is defined. One or more spilt inverse arrays are also defined for each ordered array. The minimum and optimum number of bits required to store the array A[.] in terms of the split arrays and split inverse arrays are determined. Then, the original array is stored in such a way that the total amount of memory used is minimized.

1 Claim, 5 Drawing Sheets

| | |
|---|---|
| 1. | Given an array $A[\cdot]$, set $A^0[\cdot] = A[\cdot]$, set $j = 0$. |
| 2. | For $A^j[\cdot]$ find $\hat{k}$ using Equation (8). Set $k_j = \hat{k}$. |
| 3. | If $k_j = \text{width}(A^j[\cdot])$ store $A^j[\cdot]$ and stop. |
| 4. | Separate $A^j[\cdot]$ into $I^j_{k_j}[\cdot]$ and $A^j_{k_j}[\cdot]$. |
| 5. | Store $A^j_{k_j}[\cdot]$. |
| 6. | Set $A^{j+1}[\cdot] = I^j_{k_j}[\cdot]$, set $j = j+1$ and return to 2. |

| | |
|---|---|
| 1. | Given an array $A[\cdot]$, set $A^0[\cdot] = A[\cdot]$, set $j = 0$. |
| 2. | For $A^j[\cdot]$ find $\hat{k}$ using Equation (8). Set $k_j = \hat{k}$. |
| 3. | If $k_j = \text{width}(A^j[\cdot])$ store $A^j[\cdot]$ and stop. |
| 4. | Separate $A^j[\cdot]$ into $I^j_{k_j}[\cdot]$ and $A^j_{k_j}[\cdot]$. |
| 5. | Store $A^j_{k_j}[\cdot]$. |
| 6. | Set $A^{j+1}[\cdot] = I^j_{k_j}[\cdot]$, set $j = j+1$ and return to 2. |

| Threshold 501 | before (Mb) 502 | after (Mb) 503 |
|---|---|---|
| No pruning | 37.8 | 20.0 |
| $1 \times 10^{-9}$ | 32.5 | 17.3 |
| $5 \times 10^{-9}$ | 26.7 | 14.3 |
| $1 \times 10^{-8}$ | 22.4 | 12.0 |
| $5 \times 10^{-8}$ | 9.39 | 4.88 |
| $1 \times 10^{-7}$ | 5.67 | 2.75 |
| $5 \times 10^{-7}$ | 1.78 | 0.76 |
| $1 \times 10^{-6}$ | 1.07 | 0.42 |

*Fig. 5*

COMPRESSION OF LANGUAGE MODEL STRUCTURES AND WORD IDENTIFIERS FOR AUTOMATED SPEECH RECOGNITION SYSTEMS

FIELD OF THE INVENTION

The present invention relates generally to speech recognition systems, and more particularly to compressing language models and word identifiers used by such systems.

BACKGROUND OF THE INVENTION

In computer systems, compression of data structures reduces memory requirements and processing time. For example, a continuous speech recognition system requires a large language model (LM). For large vocabulary systems, the LM is usually an N-gram language model. By far, the LM is the biggest data structure stored in a memory of a large vocabulary automated speech recognition (ASR) system.

However, in many small sized speech recognition systems, such as desktop computers and hand-held portable devices, memory limits the size of the LM that can be used. Therefore, reducing the memory requirements for the LM, without significantly affecting the performance, would be a great benefit to the systems.

As shown in FIG. 1, the LM can be stored as a back-off N-gram 100, see Katz, "Estimation of Probabilities from Sparse Data for the Language Model Component of a Speech Recognizer," *IEEE Transactions on Acoustic, Speech, and Signal Processing*, Vol. 35, No. 3, pp. 400–401, 1987. The N-gram 100 includes unigrams 101, bigrams 102, and trigrams 103. The back-off word trigram LM 100 shows a search for the trigram "the old man."

In the N-gram, probabilities are stored as a tree structure. The tree structure originates from a hypothetical root node, not shown, which branches out into the unigram nodes 101 at a first level of the tree, each of which branches out to the bigram nodes 102 at a second level, and so forth.

Each node in the tree has an associated word identifier (id) 111. The word id represents the N-gram for that word, with a context represented by the sequence of words from the root of the tree up to, but not including, the node itself. For vocabularies with fewer than 65,536 words, the ids generally use a two byte representation as shown at the bottom.

In addition, each node has an associated probability (prob) 112 and boundaries (bounds) 114, and each non-terminal node has an associated back-off weight (weight) 113. All these values are floating-point numbers that can be compressed into two bytes, as shown at the bottom. Therefore, each unigram entry requires six bytes of storage, each bigram entry requires eight bytes, and each trigram entry requires four bytes.

The information for all nodes at a particular level in the tree is stored in sequential arrays as shown in FIG. 1. Each array in the ith level of the tree represents sequential entries of child nodes in the (i−1)th level of the tree. The largest index of each entry is the boundary value for the entry that is stored in the parent node of that entry.

Because entries are stored consecutively, the boundary value of a parent node in the (i−1)th level, together with the boundary value of the sequentially previous parent node at the same level specifies the exact location of the children of that node at the ith level.

To locate a specific child node, a binary search of the ids of the word is performed between two specified boundary values. The binary search for the example in FIG. 1 is for the phrase "the old man."

Lossy compression of the language model has been described by Whittaker et al., "Language Model Compression Techniques," *Proceedings of EUROSPEECH*, 2001, and and Whittaker et al., "Language Model Quantization Analysis," *Proceedings of EUROSPEECH,* 2001. They described the lossy compression of the language model (LM) through pruning and quantization of probabilities and backoff weights.

It is desired to further compress the language model using lossless compression so that large vocabulary ASR is enabled for small-memory devices, without an increase in me word error rate.

SUMMARY OF THE INVENTION

The invention provides for the compression of ordered integer arrays, specifically word identifiers and other storage structures of a language model of a large vocabulary continuous speech recognition system. The method according to the invention converts ordered lists of monotonically increasing integer values, such as are commonly found in the language models, into a variable-bit width tree structure so that the most memory efficient configuration is obtained for each original list.

By applying the method according to the invention, it is possible to obtain an 86% reduction in the size of the language model with no increase in the word error rate.

More specifically, a method compresses one or more ordered arrays of integer values. The integer values can represent a vocabulary of a language mode, in the form of an N-gram, of an automated speech recognition system. For each ordered array to be compressed, and an inverse array I[.] is defined. One or more spilt inverse arrays are also defined for each ordered array.

The minimum and optimum number of bits required to store the array A[.] in terms of the split arrays and split inverse arrays are determined. Then, the original array is stored in such a way that the total amount of memory used is minimized.

BRIEF DESCRIPTION OF THE DRAWINGS

FIG. 2 is a block diagram of an ordered array, and corresponding split and split inverted arrays according to the invention;

FIG. 3 is a block diagram of steps of a method for compressing an ordered integer array according to the invention;

FIG. 5 is a table comparing storage requirements of uncompressed and compressed language models.

DETAILED DESCRIPTION OF THE PREFERRED EMBODIMENT

Figure 1:
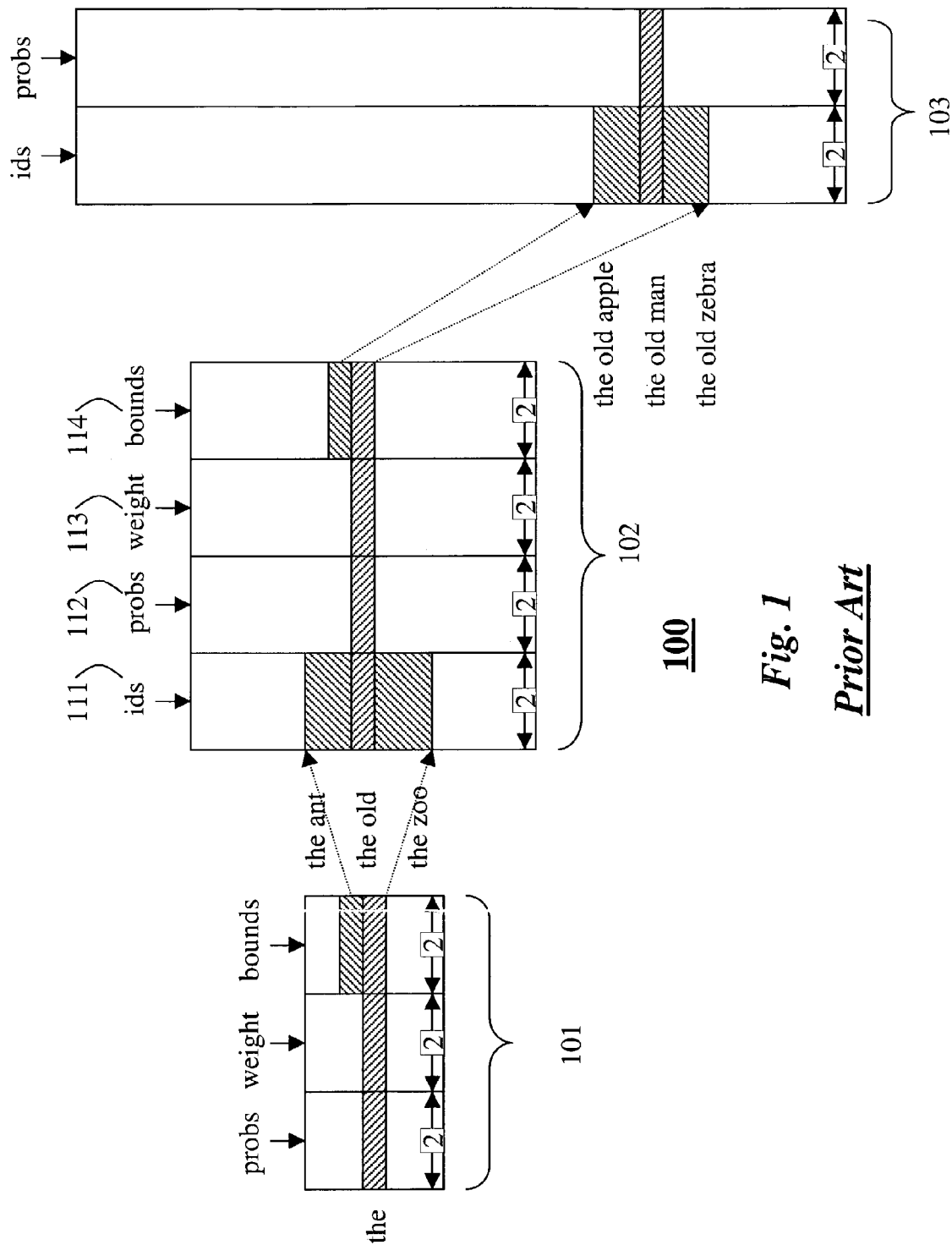
FIG. 1 is a block diagram of a prior art language model to be compressed according to the invention.

The invention provides for lossless compression of ordered arrays, i.e., lists of monotonically increasing integer values. More specifically, a method according to the invention compresses a language model (LM) as used with a large vocabulary speech recognition system. The LM is represented as a tree with multiple layers.

In the LM, there are two main structures in which large, ordered arrays of monotonically increasing numbers are stored: arrays of word identifiers (ids), and arrays of boundaries (bounds) that store the locations of word ids in other layers.

The number of bits required to represent each entry in such an array is dictated by the largest value to be represented in the array, rounded up to an integer number of bytes. Therefore, sixteen bits (two bytes) are required to store each word id for a vocabulary of 65,536 words. Even if the largest word id occurring in a given context has a value of 15, i.e., a four bit number, sixteen bits must still be used to represent all the numbers in that context.

Common compression strategies for long lists of numbers use variable-bit length coding (VLC) of the original numbers, see Williams et al., "Compressing Integers for Fast File Access," *The Computer Journal*, Vol. 42, no. 3, pp. 193–201, 1999. The objective is typically to encode frequently occurring numbers by using the least number of bits. However, because each number in the array is represented using a different number of bits, it is necessary to search the arrays of compressed numbers in a strict linear fashion to locate a number. This is undesirable for retrieving the LM probabilities where fast and frequent access is required.

Instead, the method for compressing according to the invention converts each ordered array of integers into a tree structure, where each array entry has an identical number of bits. This enables binary searching, while at the same time preserving fast, random access of the compressed array entries.

Inverse Arrays

For any ordered array of positive integers A[.], an inverse array I[.] is defined by Equation (1) as:

$$I[j]=\text{inverse}(A[.])=\text{first}(j+k, A[.]): k=\arg\min_l(j+l \in A[.]), l \geq 0, \quad (1)$$

where a function first(j, A[.]) returns the location of a first instance of j in the array A[.], and a function $\min_l(j+l \in A[.])$ returns a smallest value of l such that j+l is an entry in A[.]. I[j] shows the location of the first instance of the smallest number that is greater than or equal to j, and is present in A[.].

In words, in the inverted array, the indices of the ordered array become the values in inverted elements, and values of the ordered array become the indices of the inverted array.

It is clear that the inverse array I[.] is also an ordered array. The ordered array A[.] is therefore defined completely by the inverse array I[.], together with a function length(A [.]), which returns the number of entries in A[.] according to Equation (2):

$$A[j]=\text{last}(j-k, I[.]): k=\arg\min_l(j-l \in I[.])$$
$$\forall 0 \geq j \geq \text{length}(A), \quad (2)$$

where last(j, I[.]) returns the location of the last instance of j in the inverse array I[.].

Therefore, a set {I[.], length A[.]} is equivalent to the array A[.], because the latter is derivable from the former.

Additionally, the results of all operations that can be performed on the array A[.] can be obtained from equivalent operations on the inverse array.

The array A[j] can be obtained directly from I[.] using Equation (2). The function last(j, A[j]) can simply be obtained as I[j]. The presence of a value j in the array A[.] can be tested by j∈A[.], if I [j]≠I[j+1].

Frequently, the size of the set {I[.], length A[.]} is less than the size of the array A[.]. Therefore, memory requirements can be reduced if the set {I[.], length A[.]} is stored, instead of the original ordered array, then performing the appropriate operations on the stored array.

Split Inverted Arrays

A kth split inverse of the array A[.], i.e., $I_k[.]=\text{splitinverse}_k$ (A[.]), is defined by Equation (3) as:

$$I_k[.]=\text{inverse}(A[.]>>k), \quad (3)$$

where A[.]>>k refers to the array obtained by right-shifting each entry of the array A[.] by k bits. The kth split of A[.], i.e., $A_k[.]$, is defined by Equation (4) as:

$$A_k[.]=A[.]\&\text{Mask}[k], \quad (4)$$

where Mask $$\text{Mask}[k] = \sum_{j=0}^{k-1} 2^k,$$

and $A_k[.]$ represents the array obtained by masking all but the last k bits of each of the entries of the array A[.]. Note that $I_0[.]=I[.]$. An array $A_0[.]$ is defined as a null array having the same length as the array A[.].

FIG. 2 shows examples 200 of splits and split inverse arrays derived from an ordered array. Clearly, any split inverse of an ordered array is also ordered. However, the split arrays need not be ordered.

For k>0, the combination of $I_k[.]$ and $A_k[.]$ define A[.] completely. Thus, A[.] can equivalently be stored by storing $I_k[.]$ and $A_k[.]$. All operations that are performed on A[.] can be performed using the inverse array $I_k[.]$ and the split array $A_k[.]$. For example, to find the value of an entry in the original array A[.] given a location j, apply Equation (5)

$$A[j]=\text{last}(j, I_k[.])<<k|A_k[j], \quad (5)$$

and to find the location of an entry with a value j in A[.] apply Equation (6)

$$\text{last}(j, A[.])=I_k[j>>k]+\text{last}(j\&\text{Mask}[k], A_k[I_k[j>>k]:$$
$$I_k[j>>k+1]]), \quad (6)$$

where $A_k[i:j]$ refers to the sub-array of A[.] that begins at the ith entry and ends at the (j−1) entry. The check for j∈A[.] can be performed as:

$$j \in A[.], \text{ if } I_k[j>>k] \neq I_k[j>>k+1], \text{ and}$$

$$j\&\text{Mask}[k] \in A_k[I_k[j>>k+1]]: I_k[j>>k+1]].$$

Again, the memory required to store $I_k[.]$ and $A_k[.]$ can be less than that needed for either A[.] or {I[.], length(A[.]}.

Optimal Size of Stored Array

The arrays are stored in a bit-compacted form, and the number of bits to store an entry-in the array does not need to be a multiple of eight. All entries of the array are stored in the same number of bits.

A function Size(A[.]) returns the total number of bits required to store A[.] in a simple bit-compacted entry. Size(A[.])=length(A[.])×width(A[.]), where width(A [.])=ceil($\log_2$(max(A[.]))) is the number of bits required to store the largest value in A[.]. Because A[.] can equivalently be stored by storing $I_k[.]$ and $A_k[.]$, the minimum memory required to store A[.] in terms of its split arrays and split inverses, when all arrays are stored in simple bit-compacted form is given by Equation (7) as:

$$MinSize(A[\cdot]) = \min_k \{Size(I_k[\cdot]) + Size(A_k[\cdot] + C_k\}, \quad (7)$$

where $C_k$ is the overhead required to store the pointers to the split arrays, their length, and the information needed to indicate that the array is stored in terms of its kth split arrays.

However, the split inverse array $I_k[\cdot]$ is also an ordered array and can be further compressed by storing it in terms of its split inverse and split arrays, and so forth.

A function OptSize(.) determines the optimal storage required to store an array in terms of its split arrays. The optimal size to store the array $A[\cdot]$ is defined by Equation (8) as:

$$OptSize(A[\cdot]) = \min_k (OptSize(I_k[\cdot]) + Size(A_k[\cdot] + C_k). \quad (8)$$

and $\hat{k}$ is the optimal value of k in Equation 8.

Method for Recursive Compression of Arrays

FIG. 3 shows six steps of a method 300 for recursively compressing an ordered array A[.] according to the invention, in terms of the notation as described above.

The output of the method 300 is a set of split arrays $A_{k_0}^0[\cdot], A_{k_1}^1[\cdot], A_{k_2}^2[\cdot], \ldots, A_{k_{J-1}}^{J-1}[\cdot]$, and the array $A^J[\cdot]$, where J is the value of j at which the method 300 completes.

Decoding a Number given a Location

A READ(.) operation is defined by Equation (9) as:

$$READ(i, A^J[\cdot]) = \begin{cases} LAST(i, A^{j+1}[\cdot]) << k_j | A_{k_j}^j[i] & \text{if } j < J \\ A^J[i] & \text{if } j = J \end{cases} \quad (9)$$

The LAST(.) operation in Equation (9) is described below. The ith entry of the array A[.] is now obtained as $A[i]=READ(i, A^0[\cdot])$.

Decoding a Location given a Number

The LAST(.) operation is defined by Equation (10) as:

$$LAST(i, A^j[\cdot]) = \quad (10)$$
$$\begin{cases} READ(i >> k_j, A^{j+1}[\cdot]) + \\ last(j \& Mask[k], A_{k_j}^j[READ(i >> k, A^{j+1}[\cdot]): \\ READ(i >> k+1, A^{j+1}[\cdot])]) & \text{if } j < J \\ last(i, A^j[\cdot]) & \text{if } j = J. \end{cases}$$

The location of an entry with a value i in the array in A[.] is now obtained as $last(i, A^0[\cdot])$.

Compressing the Language Model

For the purpose of the present invention, the language model 100 has already been pruned and floating point parameters have been quantized to the desired levels as described by Whittaker et al., see above.

Figure 4:
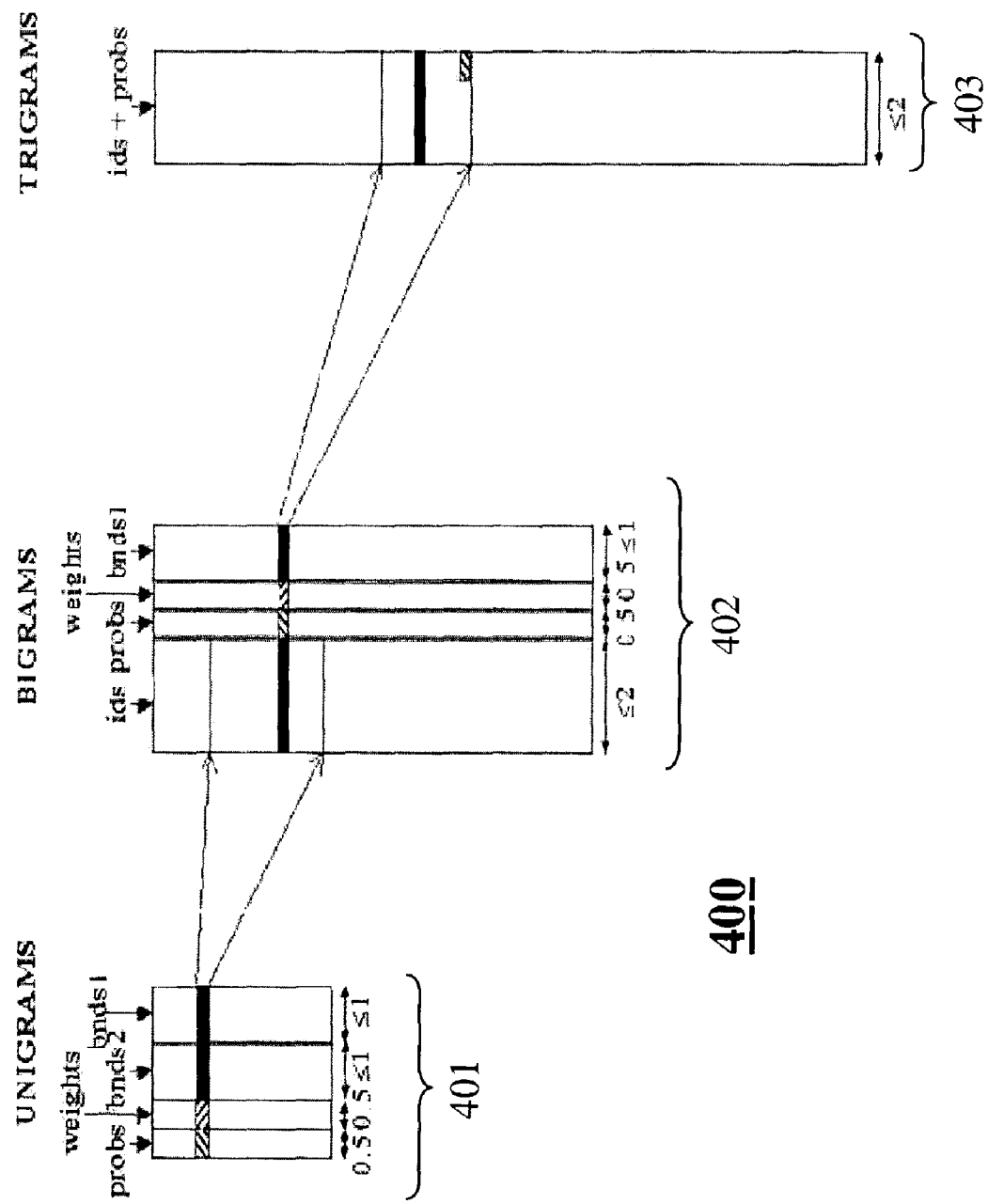
FIG. 4 is a block diagram of a language model compressed according to the invention.

Then, the lossless compression method 300 is applied to the ordered arrays to generate a compressed language model 400 as shown in FIG. 4.

Word Identifier Compression

The word ids for each context are compressed on a context-by-context basis with the optimal compression for each array found by using Equation 8.

Language Model Structure Compression

Compression of the boundary information proceeds using the 4-byte bounds array as input to the compression method 300. Because the bounds array at each level comprises the monotonically increasing integer values, it can be compressed in its entirety, unlike the arrays of word ids which are compressed separately for each N-gram context.

Context-Location Boundary Array

Because the word ids are compressed by context and the bounds are compressed globally, there is a mismatch between a word id's location and its corresponding probabilities, back-off weights and boundary information. An extra three-byte boundary array is introduced at the unigram level to correct this mismatch so that now there are two boundary arrays (bnds 1 and bnds 2). This three-byte array is likewise compressed using the method according to the invention.

The extra bounds array provides the original location of the first word id for a unigram context, as if it were in the original, uncompressed array. This offset is then added to the known location of a particular word id in a context to give the exact location of, for example, the probability for that word id. The additional three-byte array is unnecessary at the bigram level for the locations of trigram entries because word ids and their associated probabilities are stored within the same entry specified by the bounds information. However, the extra array would be used at the bigram level for a 4-gram LM.

Effect of the Invention

To determine the effect of the invention, the compression method 300 was applied to a Katz back-off LM with a 64k word vocabulary obtained from approximately 100 million words of broadcast news transcriptions and newspaper texts. All singleton bigrams and trigrams were discarded. The baseline LM was pruned at different thresholds using entropy based pruning, see Stolcke, "Entropy-based Pruning of Backoff Language Models," *Proceedings of* 1998 *DARPA Broadcast News Transcription and Understanding Workshop*, 1998.

FIG. 5 shows the effect of compression of word ids and LM structure using the integer compression method 300, for different entropy thresholds 601. Column 602 shows the storage requirements before compression, and column 603 the storage requirements after compression.

Other results, with well known training data and recognition systems, show that an unpruned, uncompressed baseline LM required 71.9 Mb of memory with a word error rate of 24.3%. The LM compressed according to the invention requires only 10Mb, with no substantial increase in the word error rate. Therefore, as desired, the invention can compress LMs to enable small-memory automatic speech recognition applications.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computer implemented method stored on a computer readable medium with executable instructions of perform compression of a language model of a continuous speech recognition system, wherein the language model is an N-gram including a plurality of arrays A[.], each array A[.] including ordered positive integer values stored in a memory, the integers representing a vocabulary of the language mode, the compressing for each array A[.] comprising:

defining an inverse array I[.] of the ordered array A[.] as $$I[j] = \text{inverse}(A[.]) = \text{first}(j+k, A[.]): k = \arg\min_l (j+l \in A[.]), l \geq 0,$$

where a function first(j, A[.]) returns a location of a first instance of an jth entry in the array A[.], and a function $\min_l(j+l \in A[.])$ returns a smallest value l such that j+l is an entry in the array A[.];

defining a kth split inverse $I_k[.] = \text{splitinverse}_k(A[.])$ of the array A[.] as $I_k[.] = \text{inverse}(A[.] >> k)$, where A[.]>>k is an array obtained by right-shifting each entry of the array A[.] by k bits;

defining a kth split of the array A[.] as $A_k[.] = A[.] \& \text{Mask}[k]$, where $$\text{Mask}[k] = \sum_{j=0}^{k-1} 2^k \cdot A[\cdot]$$

represents an array obtained by masking all but the last k bits of each of entry of the array A[.];

defining a null array $A_0[.]$ having the same length as the array A[.], defining a function Size(A[.]) for returning a total number of bits required to store the array A[.] in a compressed form as Size(A[.])=length(A[.])×width(A[.]), where width(A[.])=ceil(log$_2$(max(A[.]))) is the number of bits required to store a largest integer value in the array A[.];

defining a function MinSize for determining a minimum number of bits required to store the array A[.] in terms of the split arrays and split inverse arrays by MinSize (A[.])=$\min_k$ {Size($I_k$[.])+Size($A_k$[.])+$C_k$}, where $C_k$ is overhead required to store pointers to the split arrays, length of the split arrays, and an indication that the array A[.] is stored in terms of the split arrays and the split inverse arrays;

defining a function OptSize(.) for determining a size of the array A[.] in terms of the split arrays and the split inverse arrays as OptSize(A[.])=$\min_k$(OptSize($I_k$[.])+ Size($A_k$[.])+$C_k$}, wherein $\hat{k}$ is an optimal value of k;

determining an optimal size for the array $A^j$[.] using the function OptSize;

storing the array $A^j$[.] if $k_j$=width($A^j$[.]), and otherwise separating the array $A^j$[.] into the split inverse arrays $I_{k_j}^j$ and the split arrays $A_{k_j}^j$, and storing the split arrays $A_{k_j}^j$, and setting the array $A^{j+1}$[.] equal to the array $I_{k_j}^j$, and repeating, beginning at the determining step, for j=j+1 to generate the arrays $A_{k_0}^0$[.], $A_{k1}^1$[.], $A_{k_2}^2$[.], . . . , $A_{k_{J-1}}^{J-1}$[.], and the array $A^J$[.], where J is the value of j upon completion.

* * * * *